United States Patent [19]
Tocci

[11] Patent Number: 5,274,929
[45] Date of Patent: Jan. 4, 1994

[54] MASONRY GUIDE

[76] Inventor: Carmine Tocci, 2948 S. 15th St., Philadelphia, Pa. 19145

[21] Appl. No.: 963,988

[22] Filed: Oct. 21, 1992

[51] Int. Cl.⁵ .............................................. G01C 15/10
[52] U.S. Cl. .................................... 33/407; 33/404; 33/518
[58] Field of Search ................ 33/404, 406, 407, 408, 33/409, 410, 339, 518, 1; 248/220.1

[56] References Cited

U.S. PATENT DOCUMENTS

| | | | |
|---|---|---|---|
| 1,172,259 | 2/1916 | Crist | 248/220.1 |
| 2,503,098 | 4/1950 | Crocker | 33/410 |
| 2,832,143 | 4/1958 | Davis | 33/406 |
| 3,130,500 | 4/1964 | Bongiovanni | 33/406 |
| 4,338,728 | 7/1982 | Valead | 33/406 |
| 5,136,785 | 8/1992 | Shirley | 33/404 |

FOREIGN PATENT DOCUMENTS 2560987 9/1985 France .................. 33/404

Primary Examiner—William A. Cuchlinski, Jr.
Assistant Examiner—Alvin Wirthlin
Attorney, Agent, or Firm—Connolly and Hutz

[57] ABSTRACT

A masonry guide for supporting a vertical masonry line parallel to, and at a fixed distance from, a structural shell is disclosed. A masonry line attachment means is slidably mounted on the guide to permit location of the masonry line at the desired distance from the structural shell. The masonry guide may be attached to either a flat surface or corner of the structural shell. Alignment of the masonry guide with door and window jambs is facilitated by a locating tab pivotally mounted in the guide.

7 Claims, 3 Drawing Sheets

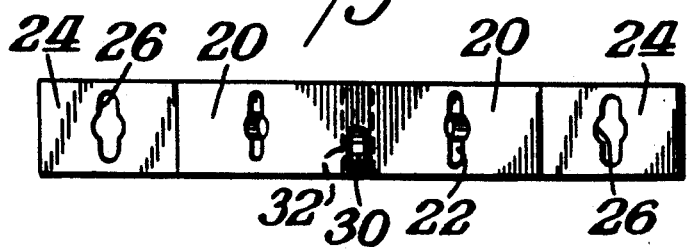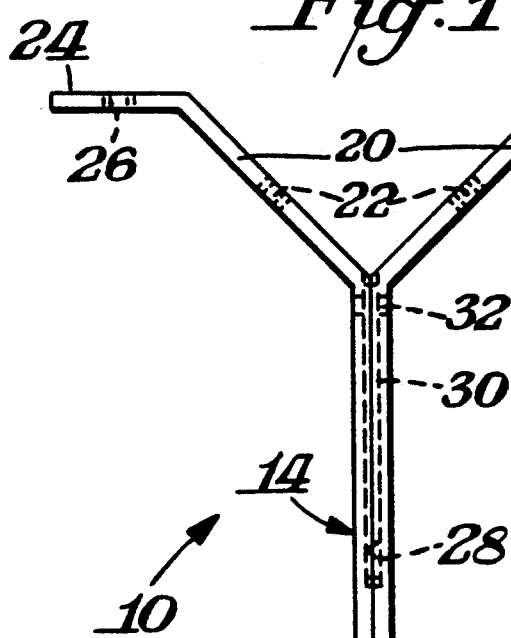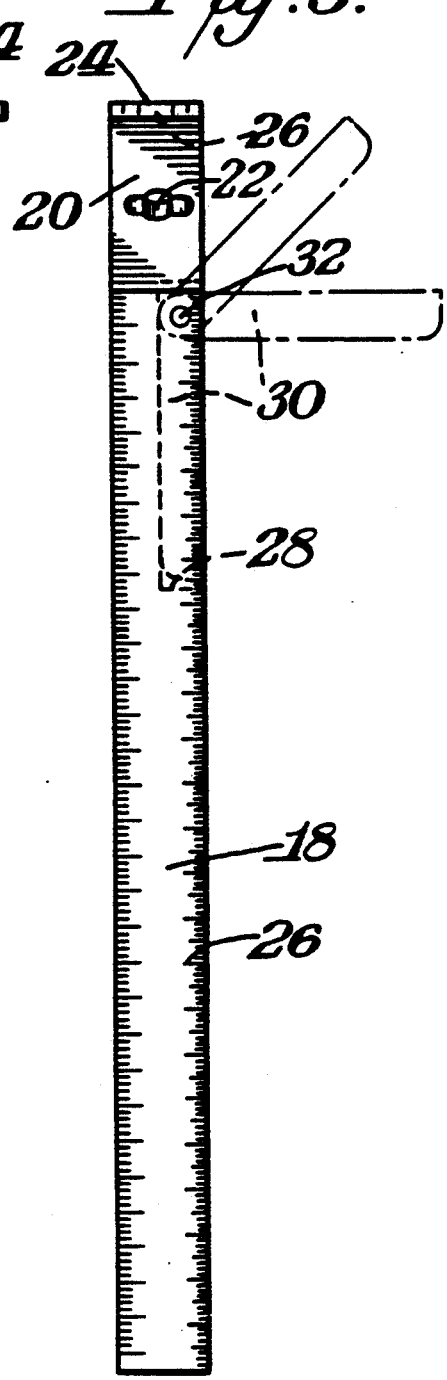

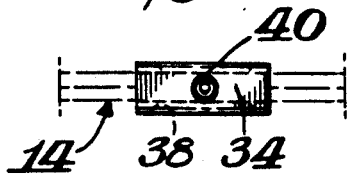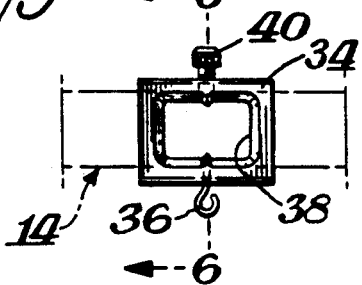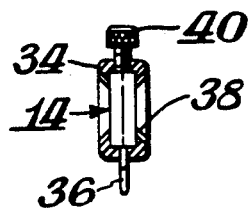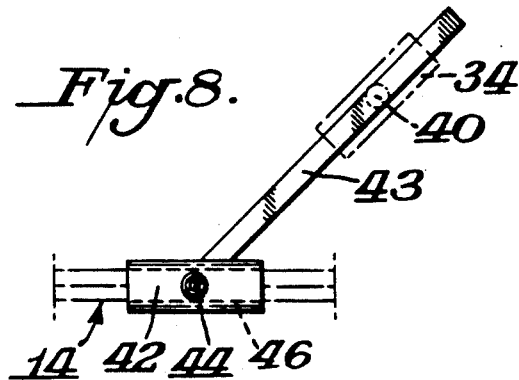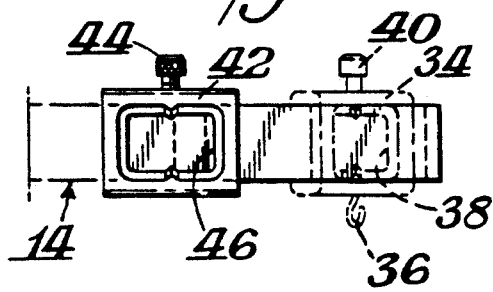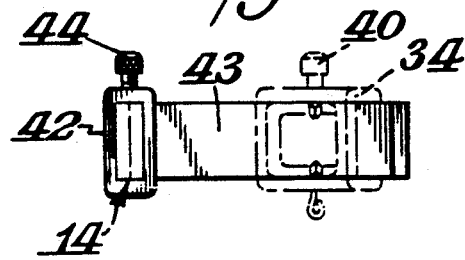

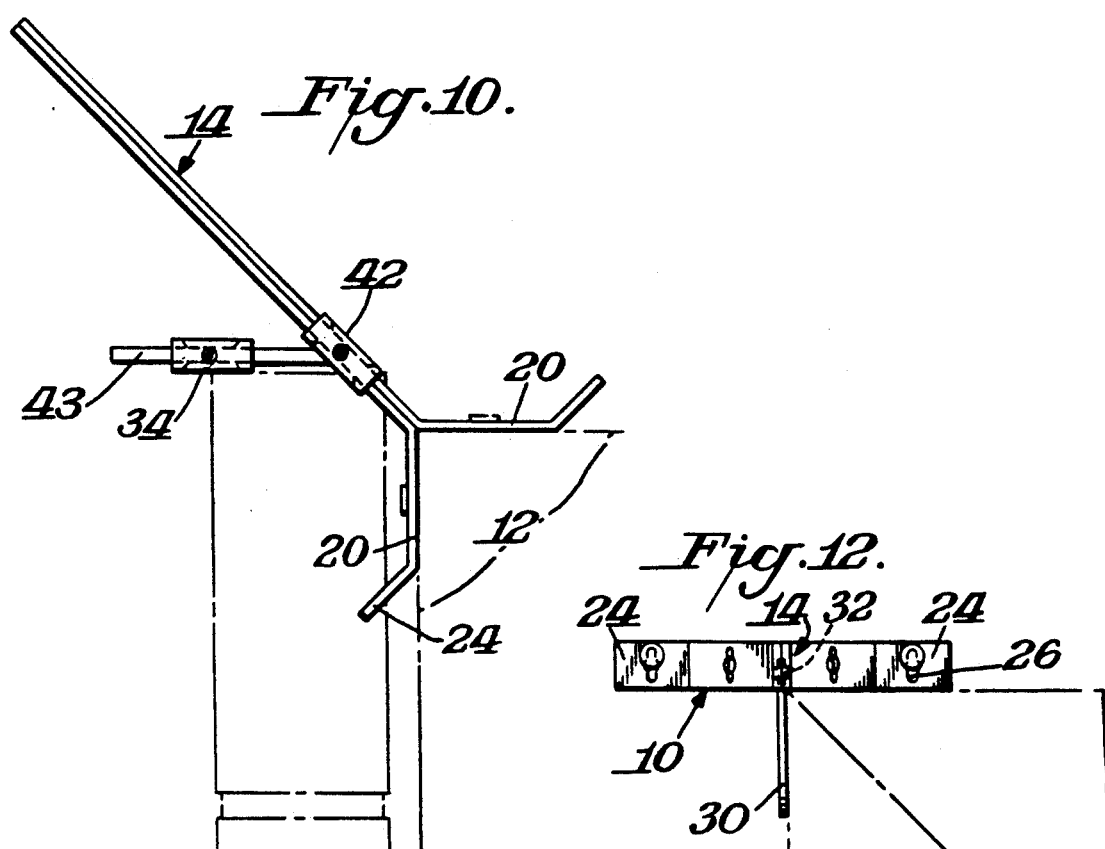
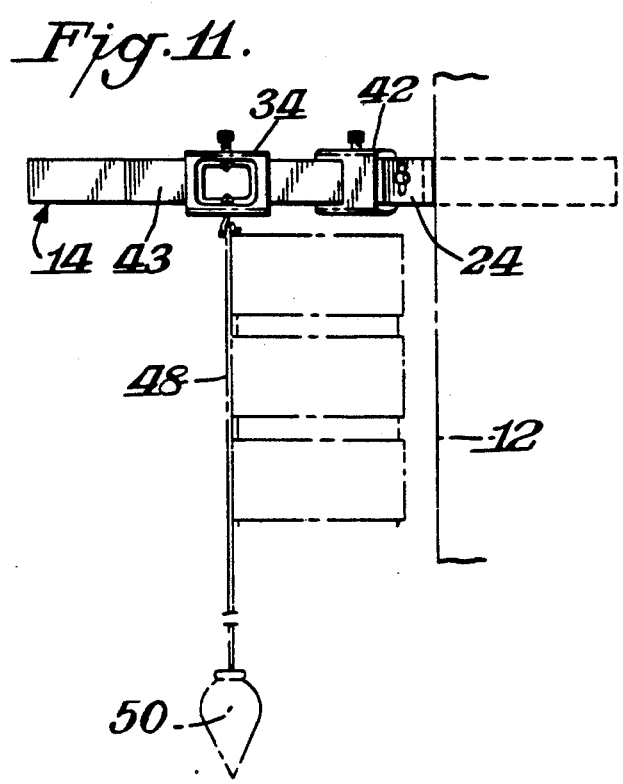

MASONRY GUIDE

BACKGROUND OF THE INVENTION

Various efforts have been made to facilitate the vertical alignment of masonry surfaces applied over a structural shell. Among these are mason's guides fixedly attached with various brackets to the shell and/or supporting foundation. Examples of such arrangements are shown in Schneider et al U.S. Pat. No. 2,666,260, Johnson U.S. Pat. No. 3,150,449, Barlow U.S. Pat. No. 3,201,870 and Sarasin U.S. Pat. No. 4,970,797. Other masonry guides are illustrated in Alwood U.S. Pat. No. 2,544,645 and Schraider U.S. Pat. No. 2,952,915.

These and like devices are primarily used to adjust the vertical spacing of brick layers and maintain the horizontal alignment of such bricks along a given wall. They do not, however readily permit the vertical alignment of the masonry surface.

SUMMARY OF THE INVENTION

In order to permit proper vertical alignment of masonry walls the current invention allows placement of a masonry guide on a structural shell. One end of the guide is attached to the shell and the other end extends perpendicularly from the shell a distance in excess of the normal thickness of masonry veneer on the shell. A line attachment means is slidably attached to that portion of the guide extending from the shell and a line with plumb bob is attached thereto. The line attachment means is then located on the guide at a distance corresponding to the desired thickness of the masonry veneer on the structural shell.

The masonry guide is quickly and easily attached to the structural shell, preferably on a corner thereof. Movement of the line attachment means and corresponding line quickly sets the desired location of the masonry exterior. Unlike the prior art devices using solid poles and the like which must be fixedly attached at the top and bottom, the masonry guide of this invention is easily installed to provide accurate guidance to masonry contractors.

The masonry guide of the current invention also eliminates the need to repeatedly move the guide as brick courses are added. The instant guide can be mounted to the structural shell at the top and left in place until the masonry wall is completed.

The line attachment means can also be arranged with an arm extending therefrom at a 45° angle to permit location of masonry veneer surfaces that do not extend around corners of the structural shell. In many applications, especially residential, a veneer surface will be applied to only one wall of the shell. The end surface of the veneer, however, typically extends one or two inches beyond the corner of the structural shell to align with the other wall finishing, such as siding or the like. This is in contrast to the normal corner of a masonry veneer that would extend the full thickness of the masonry veneer beyond the shell. The 45° extension on the line attachment means permits the location of the end surface of the veneer at the appropriate distance from the structural shell in those situations where the veneer is applied to only one wall.

Another feature of the masonry guide is a movable tongue which extends from the guide to accurately locate the end wall of masonry surfaces adjacent a door or window opening. The tongue is pivotally located in the center recess of the guide and can be swung into position below the guide and placed against a door or window jamb to locate the guide in a position marking the vertical end wall of the masonry surface abutting the jamb.

BRIEF DESCRIPTION OF THE DRAWINGS

FIG. 1 is a top plan view of the masonry guide of this invention;

FIG. 2 is an end elevation view of the masonry guide of this invention;

FIG. 3 is a side elevational view of the masonry guide showing the locating tab associated therewith in an extended position (in phantom) and in a retracted position within the guide;

FIG. 4 is a side elevational view of the line attachment means of this invention with hook for attaching the vertical masonry line and screw means for fixedly attaching the line attachment means to a masonry guide member.

FIG. 5 is a top plan view of the line attachment means of this invention.

FIG. 6 is a cross sectional view of the line attachment means along the line 6—6 of FIG. 4

FIG. 7 is a side elevational view illustrating another embodiment of the line attachment means with an arm extending therefrom at an acute angle and with a second line attachment means on the arm shown in phantom;

FIG. 8 is a top plan view of the line attachment means of FIG. 7;

FIG. 9 is a end elevational view of the line attachment means of FIG. 7;

FIG. 10 is a top plan view of the masonry guide of this invention showing its placement on a structural shell;

FIG. 11 is a side elevational view of the masonry guide in relationship to the structural shell and masonry veneer on such shell;

FIG. 12 is an end elevational view of the masonry guide showing the locating tab extended from the guide abutting a window jamb.

DETAILED DESCRIPTION OF THE INVENTION

The masonry guide 10 illustrated in FIG. 1 comprises three sections or members. The first guide member 14 is an elongated, rigid member, preferably rectangular in cross section, that contains measurement indications 26, thereon in metric or English units. As illustrated, the first guide member 14 comprises two rectangular rods 16 and 18 laminated or bolted together. The guide member 14 may be made of a rigid material that will not readily bend or warp in use, for example, aluminum, reinforced plastic or steel. If the latter, a suitable galvanized surface should be applied or stainless steel used to prevent rusting and corrosion.

Adjacent one end of the first guide member 14, are diverging second guide members 20 that preferably form a right angle at their juncture with the first guide member. This angulation is designed to facilitate placement of the masonry guide 10 on the corner of a structural shell 12 as illustrated in FIG. 10.

Third guide members 24 extend from the end of second guide members 20 in a plane perpendicular to the first guide member 14. This orientation is designed to facilitate placement of the masonry guide on a flat surface of the structural shell 12 as opposed to a corner thereof. Placement in either orientation (corner or flat surface) is facilitated by slots 22 in the second members 20 and slots 26 in third members 24. The slots 22 and 26 are designed with enlarged central openings and narrowed ends to facilitate installation and removal of the guide. Nails or other fasteners with heads slightly smaller than the central openings of the slots 22 and 26 can be installed on the structural shell 12 and the masonry guide 10 placed thereover and slid downward so that the head of the fastener engages the narrower upper end of the slots to hold the guide 10 in place.

Pivotally mounted at pin 32 in first guide member 14 is a locating tab 30. In normal use the locating tab 30 is recessed in slot 28 of the guide member 14. When the guide member 10 is to be used for aligning masonry surfaces adjacent a door or window jamb it may be rotated out of this recess into the position shown in phantom in FIG. 3. The tab in its extended position is placed against a door or window jamb to provide vertical alignment of masonry adjacent the jamb as illustrated in FIG. 12.

FIGS. 4-6 illustrate one embodiment of the line attachment means 34 used as part of the masonry guide 10. This line attachment means 34 has an interior passage therethrough that closely corresponds to the exterior dimensions of the first guide member 14 so that it can slide along such member but be snug enough not to wobble or tilt in relation to guide member 14. The bottom of line attachment means 34 contains a hook 36 for attachment of a string 48 and plumb bob 50 (see FIG. 11). A knurled knob or other fastener means 40 is arranged in the top of line attachment means 34 to affix it to the first guide member 14 at the appropriate distance from the structural shell corresponding to the exterior masonry surface being applied to that shell as illustrated in FIGS. 10 and 11.

In use the masonry guide 10 of this invention is attached to the structural shell 12 by nails or other fasteners as described above. Typically the guide 10 is placed on the corner of the shell 12 at the top thereof so that it does not obstruct the application of the masonry veneer to the shell 12 and does not need to be moved during such application. Once the thickness of the masonry veneer is determined (typically 4½ inches for brick and 5½ inches for stone) the line attachment means 34 is moved a corresponding distance along the first guide member 14 away from shell 12 so that the hook 36 thereon is immediately above the exterior edge of the masonry surface. A line 48 with a plumb bob 50 at one end thereof is attached to the hook 36 to establish the vertical plane of the masonry surface.

In a situation where the masonry veneer will extend around the corner of the structural shell 12 the hook 36 on line attachment means 34 is aligned directly above the outer corner of that masonry surface to establish a plumb line from which the entire masonry wall is built. This facilitates the creation of masonry corners from which even, horizontal surfaces along the balance of a masonry wall can be established in a manner well known to artisans in this area.

The distance of the hook 36 and line 48 from shell 12 may be calculated based on the thickness of the masonry veneer and the line attachment means 34 moved a corresponding distance indicated by the measurements 26 on first guide member 14. These measurements 26 are viewed in the window 38 of line attachment means 34. Once this distance is established the line attachment means 34 can be held in place on the first guide member 14 by tightening attachment means 40.

Another embodiment of a line attachment means is illustrate in FIGS. 7-9 and is specially adapted for those situations where a masonry veneer is applied to one surface of a structural shell 12. In such applications the masonry surfaces will not extend an equal distance from both surfaces adjacent the corner of the shell 12. To accommodate this unequal distancing from the shell a second embodiment of a line attachment means 42 is used. This means 42 has an arm or fourth guide member 43 extending therefrom. This line attachment means 42 is slidable on first member 14 in the same manner as the other line attachment means 34 and can be affixed thereto with fastener 44.

The fourth guide member 43 extends from line attachment means 42 at an acute angle (preferably 45°) and is dimensioned to accommodate the line attachment means 34 in slidable engagement thereon.

In use the line attachment means 42 is slid along first guide member 14 until the hook 36 on line attachment means 34 is at the desired location of the end of the masonry surface being applied to one wall of the structural shell 12. Then the depth of the masonry veneer on that wall of the shell is established and the line attachment means 34 moved to a point corresponding to that depth (see FIG. 10).

What is claimed:

1. A masonry guide for establishing vertical alignment of exterior masonry surfaces adjacent a structural shell comprising
   a first member capable of extending substantially perpendicular from the structural shell
   said first member containing at one end thereof two diverging second members having means therein for attachment to the corner of a structural shell
   said second members containing a third member at each end thereof arranged perpendicular to the first member having means therein for attachment to a planar surface of a structural shell
   each of the said second and third members being integral extensions of said first member
   and slidable line attachment means movable on said first member.

2. The masonry guide of claim 1 wherein the means for attachment of the second and third members to the shell comprise slots therein.

3. The masonry guide of claim 1 wherein the first member contains measurement indications thereon.

4. The masonry guide of claim 3 wherein said slidable line attachment means contains an opening therein to view the measurement indications on the first member.

5. The masonry guide of claim 1 wherein the slidable line attachment means contains a fourth member thereon extending at an acute angle to the slidable line attachment means.

6. The masonry guide of claim 5 wherein the fourth member is capable of receiving a line attachment means slidably movable thereon.

7. The masonry guide of claim 1 wherein a locating tab is pivotally mounted in a recess within the first member and is capable of being rotatably moved into a position outside the plane of the first member for alignment with a surface against which masonry is to be placed.

* * * * *